United States Patent [19]

Laskaris

[11] 4,385,248
[45] May 24, 1983

[54] SUPPORT METHOD AND STRUCTURE FOR EPOXY IMPREGNATED SADDLE-SHAPED SUPERCONDUCTING WINDINGS

[75] Inventor: Evangelos T. Laskaris, Schenectady, N.Y.

[73] Assignee: General Electric Company, Schenectady, N.Y.

[21] Appl. No.: 217,329

[22] Filed: Dec. 17, 1980

[51] Int. Cl.³ .............................................. H02K 9/00
[52] U.S. Cl. ........................................ 310/52; 310/43; 310/45; 310/184; 310/185; 310/214; 310/215; 29/596; 29/598; 336/197
[58] Field of Search ....................... 310/43, 56, 51, 52, 310/271, 214, 215, 91, 179, 208, 254, 258, 261, 264, 265, 85, 180, 184, 198, 10, 64; 336/197, DIG. 1; 29/596, 598, 599; 174/15 S; 335/216

[56] References Cited

U.S. PATENT DOCUMENTS

| | | | |
|---|---|---|---|
| 2,173,726 | 9/1939 | Prindle | 310/215 |
| 2,180,983 | 11/1939 | Hall | 310/215 |
| 3,079,519 | 2/1963 | Kitson | 310/45 |
| 3,436,815 | 4/1969 | Sheets | 310/45 |
| 3,842,303 | 10/1974 | Simmonds | 336/197 |
| 3,877,142 | 4/1975 | Hamano | 310/45 |
| 4,013,908 | 3/1977 | Weghaupt | 310/52 |
| 4,060,743 | 11/1977 | Weghaupt | 310/214 |
| 4,137,471 | 1/1979 | Sato | 310/51 |
| 4,228,375 | 10/1980 | Beermann | 310/214 |
| 4,282,450 | 8/1981 | Eckels | 310/52 |

OTHER PUBLICATIONS

H. Hahn, "Isabelle-A Progress Report," IEEE Transactions on Magnetics, vol. MAG-17, No. 1, Jan. 1981, pp. 702-708.
A. D. McInturff et al., "BNL Superconducting Storage Ring Magnet Update," IEEE Transactions on Magnetics, vol. MAG-15, No. 1, Jan. 1979, pp. 654-657.
A. V. Tollestrup, "Progress Report-Fermilab Energy Doubler," IEEE Transactions on Magnetics, vol. MAG.-15, No. 1, Jan. 1979, pp. 647-653.
K. Koepke et al., "Fermilab Doubler Magnet Design and Fabrication Techniques," IEEE Transactions on Magnetics, vol. MAG-15, No. 1, Jan. 1979, pp. 658-661.

Primary Examiner—R. Skudy
Attorney, Agent, or Firm—Charles E. Bruzga; James C. Davis, Jr.; Marvin Snyder

[57] ABSTRACT

A method and structure for restricting relative sliding motion at the interfaces between a superconducting winding and a supporting structure for the winding. An interface lining material having a low shear modulus of elasticity so as to accommodate large shear displacements with low shear stresses is used as opposed to the use of sliding frictional contact between the contacting surfaces of the electrical winding and the supporting structure. The invention is completed by subjecting the lined interfaced surfaces to large compressional pressure forces so that frictional forces between the interface material and the opposing superconducting winding and supporting structure surfaces, even at low coefficients of friction, are considerably higher than the internal shear forces of the interfacing lining material. The superconducting winding is comprised of a plurality of conductors of superconducting material bunched together in close thermal contact with each other and secured in a solid winding bundle by epoxy resin. The interface lining material preferably is wrapped completely around and surrounds the superconducting winding.

15 Claims, 5 Drawing Figures

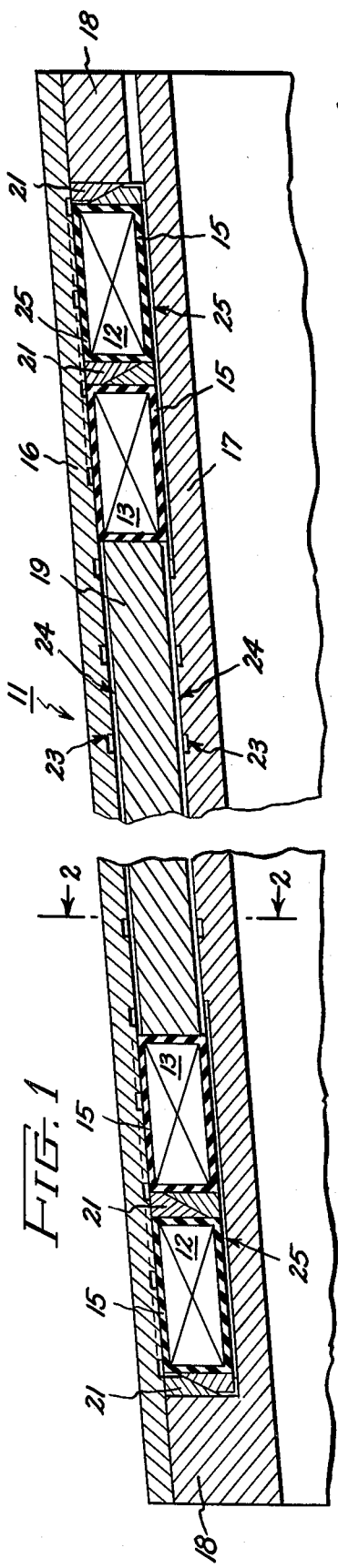
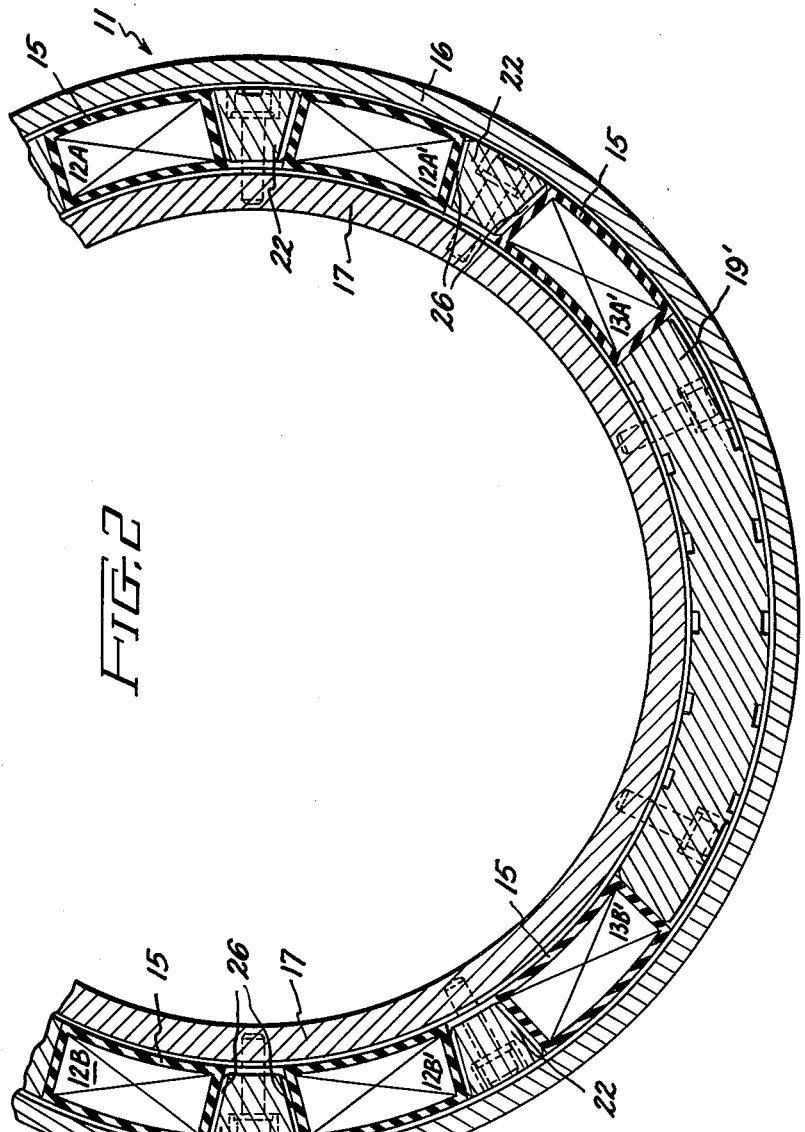
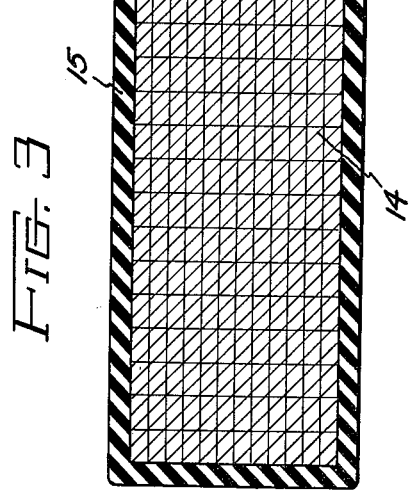

N = COMPRESSION FORCE
D = DISPLACEMENT
T = fN = FRICTIONAL FORCE
f = COEFFICIENT OF FRICTION
S = SHEAR FORCE

SUPPORT METHOD AND STRUCTURE FOR EPOXY IMPREGNATED SADDLE-SHAPED SUPERCONDUCTING WINDINGS

BACKGROUND OF THE INVENTION

This invention relates to a new and improved method and structure for supporting a superconducting winding on a support structure by means of interface lining material having a low shear modulus of elasticity, whereby frictional heat generated by relative sliding motion at the interface surfaces of the electrical winding with the support structure, is minimized.

More particularly, the invention relates to such a method and structure which is specially suited for use in the fabrication of superconducting windings of the type that are saddle-shaped and comprised of a number of superconducting conductor elements held together in a large bundle by epoxy resin to form relatively large stator or rotor windings for cryogenic generators and motors in order to overcome the problem of degradation of winding performance caused by frictional heat generated by relative sliding motion between such windings and their support structures.

The stator and/or rotor windings of cryogenic electrical generators and motors generally are comprised of two or more nested saddle-shaped superconducting windings with each saddle-shaped winding being comprised of a plurality of superconducting conductors that are bunched together in close thermal and electrical contact with each other and secured in a solid winding bundle by epoxy resin. While the epoxy-impregnation of the bundle of superconducting conductors solves the problems of degradation of winding performance that could be caused by individual conductor motion within the larger bundle winding, the epoxy-impregnation techniques do not solve the problems of winding performance degradation caused by relative sliding motion between the epoxy impregnated saddle-shaped winding bundle and the support structure for the winding bundle hereafter referred to as the saddle-shaped winding. Saddle-shaped windings fabricated in the above-described manner when electrically excited and placed in operation encounter substantial centrifugal and magnetic forces which make it extremely difficult to prevent relative sliding motion between such windings and their support structure. Relative sliding motion between the winding and the support structure causes sufficient local heat to be generated due to friction so as to raise the temperature of at least portions of the winding above the critical temperature of one or more of the superconducting conductors comprising the winding. Thus, the frictionally-generated heat results in degradation of winding performance.

SUMMARY OF THE INVENTION

It is therefore a primary object of the invention to provide a new and improved method and winding structure for supporting a superconducting winding on a support structure in a manner such that frictional heat and losses incurred as a result of the frictional heat generated by relative sliding motion at the interfaces of the superconducting winding with its support structure, are minimized.

Another object of the invention is to provide a new and improved superconducting electrical winding and support structure for use as the stator or rotor winding for cryogenic generators and motors and which are saddle-shaped and comprised of a number of superconducting conductor elements secured together in a winding bundle by epoxy resin with the winding bundle being supported in a manner such that relative sliding motion between the saddle-shaped winding bundle and the support structure is reduced to a minimum to thereby overcome winding performance degradation due to frictionally-generated heat losses.

A feature of the invention is the provision of a method and structure for restricting relative sliding motion at the interfaces between a superconducting winding and a support structure for the winding. For this purpose an interface lining material having a low shear modulus of elasticity is placed between the interfacing surfaces of the superconducting winding and the support structure so as to accommodate large shear displacements with low shear stresses as opposed to the use of the forces of friction alone in prior art arrangements between the interfacing surfaces of the superconducting winding and the supporting structure. The method and structure is completed by subjecting the interface lining material to large compressional pressure forces so that frictional forces between the interface lining material and the opposing superconducting winding and support structure surfaces, even at low coefficients of friction, are considerably higher than the internal shear forces of the interface lining material. Preferably, the interface lining material is formed from leather, cellulose paper or polyethylene paper.

Another feature of the invention is the provision of a superconducting winding fabricated from superconducting material and which during electrical operation of the winding is maintained at cryogenic temperature levels. Maintenance of the cryogenic temperature operating condition is facilitated by minimization of frictional heat losses that otherwise would be developed by relative sliding motion at the interfaces between the superconducting electrical winding and the supporting structure. The superconducting winding preferably is comprised of a plurality of conductors of superconducting material bunched together in close thermal and electrical contact with one another. The interface lining material preferably is wrapped around and completely surrounds the superconducting winding thus comprised.

A still further feature of the invention is the provision of a method and means wherein the superconducting winding is comprised of a plurality of saddle-shaped windings physically nested together one within the other and the supporting structure is comprised of two semi-cylindrical inner and outer shells compressed together with the nested saddle-shaped windings disposed within an annulus space defined between the inner and outer shells. The structure further includes complementary-shaped core and wedging members tightly wedged intermediate the nested saddle-shaped windings within the annular space defined between the inner and outer shells for subjecting all of the members including the nested saddle-shaped windings and the interior surfaces of the inner and outer shells to large compressional pressure forces. The saddle-shaped windings preferably are superconducting and formed from a plurality of conductors of superconducting material bunched together in close thermal and electrical contact with one another. The interface lining material preferably is wrapped around and completely surrounds the saddle-shaped superconducting windings thus formed.

BRIEF DESCRIPTION OF THE DRAWINGS

These and other objects, features and many of the attendant advantages of this invention will be appreciated more readily as the same becomes better understood from a reading of the following detailed description, when considered in connection with the accompanying drawings, wherein like parts in each of the several figures are identified by the same reference character, and wherein:

FIG. 1 is a longitudinal sectional view of a new and improved superconducting winding and support structure therefor constructed according to the invention;

FIG. 2 is a cross-sectional view taken through plane 2—2 of FIG. 1;

FIG. 3 is a cross-sectional view through one winding module alone showing the internal construction of the winding;

DESCRIPTION OF PREFERRED EMBODIMENTS

FIG. 1 is a partial longitudinal sectional view of the principle structural members employed in practicing the invention. FIG. 1 has been broken at the center due to the fact that the illustration would extend off of the page if its full length was illustrated for the scale used. Considering FIG. 1 in conjunction with FIG. 2, it will be seen that the structure comprises an elongated semicylindrically shaped member 11 which is in fact frusto-conical in configuration. Taking a cross section through plane 2—2 of FIG. 1 results in the partially illustrated cross-sectional view of FIG. 2.

Figure 4:
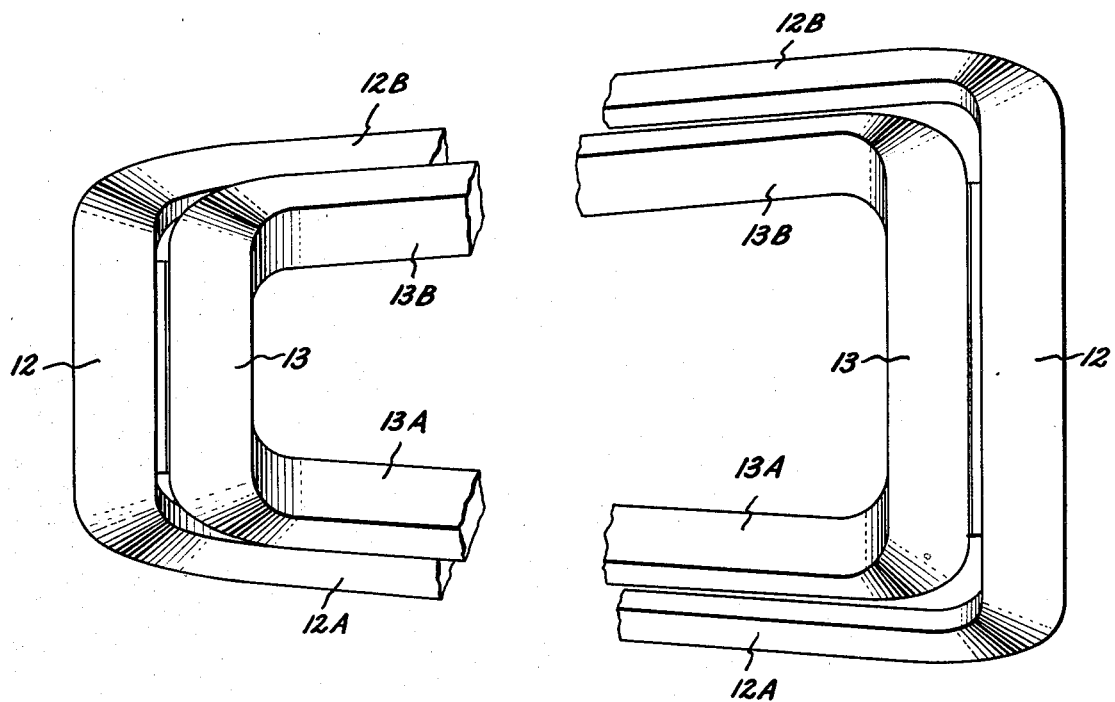
FIG. 4 is a partial, planar perspective view of two saddle-shaped winding modules nested together and which comprise a part of the superconducting winding and support structure shown in FIGS. 1 and 2 of the drawings.

Supported within the frusto-conical member 11 are two superconducting winding modules 12 and 13 which, as best shown in FIG. 4, are saddle-shaped and nested one within the other. The right and left legs 12A and 12B, respectively, of the winding module 12 are shown at 12A and 12B in FIGS. 2 and 4. The corresponding right and left legs of a lower set of nested winding modules 12A', 12B' and 13A', 13B', are shown in FIG. 2 and would have the same configuration as shown in FIG. 4 but would be in an inverted position from that shown in FIG. 4.

FIG. 3 is a cross-sectional view of one of the winding modules 12 or 13 and illustrates its construction. As shown in FIG. 3, each of the winding modules is comprised of a plurality of conductors, such as shown at 14, which are bunched together in close thermal and electrical contact with one another in a solid winding bundle which then is treated with epoxy resin so that all of the individual conductors 14 are epoxyed together. In the embodiment of the invention herein illustrated, the conductors 14 are fabricated from a superconducting material. While winding the individual superconducting conductors 14 together in a bunch, the winding process takes place on a suitable mandrel so that the saddle-shaped configuration illustrated in FIG. 4 is achieved.

After formation of the saddle-shaped winding modules 12 and 13, and the corresponding lower set of modules 12' and 13' (not shown) in the above-described manner, each of the modules is wrapped or otherwise enclosed in a suitable interface lining material shown at 15 in FIG. 3. The interface lining material 15 is electrically insulating in nature and has a low shear modulus of elasticity. Suitable materials for use as the interface lining material are leather, cellulose paper, polyethylene paper and like materials.

Referring again to FIGS. 1 and 2, it will be seen that the semi-cylindrical support structure 11 is comprised of an outer semi-cylindrical shell 16 and an inner complementary-shaped semi-cylindrical shell 17 with the inner shell 17 having two integrally-formed flange portions 18 at each of the ends thereof. The inner and outer shells 16 and 17 after assemblage define an annular space in which the nested saddle-shaped windings 12, 13, and 12', 13' (not shown) are mounted. The straight sections of the modules 12A, 12B and 13A, 13B shown in FIG. 4 (and the corresponding sections of the lower modules) are fastened tangentially between two annular pole sections, the upper one of which is shown at 19 in FIG. 1 and the lower one of which is shown at 19' in FIG. 2. The winding modules surround the pole sections 19, 19' and are contained axially within the annular space between shells 16 and 17 by means of shoulders formed by the integral flanges or rim portions 18 of inner shell 17 at each end of the semicylindrical structural member 11. Wedges shown at 21 are disposed adjacent the windings and are used to compress the circular end-turns of the winding modules axially against the ends of the pole sections 19, 19' between the shoulders formed by flanges 18.

Cooling of the outside surface of the winding modules is provided by means of axial and circumferential cooling channels on the shells 16 and 17, the annular pole sections 19 and the wedges 22. The cooling channels 23 on the inner shell 17 and outer shell 16 run circumferentially over the majority of the length of the winding as shown in FIG. 1. Axial cooling channels 24 are provided on the annular pole sections 19 to provide communication between the circumferential cooling channels 23. In the winding end region this communication is provided by axial cooling channels 25 on the inner and outer shells. Radial cooling channels 26 are provided in the surfaces of wedges 22 in contact with lining material 15.

The subassembly of the winding modules 12, 13 and 12', 13' (not shown) together with their associated core members i.e., the annular pole sections 19, 19' and wedges around the inner shell member 17, is assembled inside the outer semi-cylindrical (frusto-conical) shell member 16 by means of an interference fit so as to compress the winding modules against the inner shell member and enhance the wedging action of the wedges 21. To further enhance this wedging action additional wedges 22, shown in FIG. 2, are distributed radially around the circumference of the annular space in which the straight sides of the saddle-shaped windings are secured as shown in FIG. 2. The primary function of the support structure as thus comprised, is to maintain the compressional pressure forces on the interface lining material around the winding modules at low temperatures and during periods while the winding modules are being electrically operated. At the same time, the support structure is expected to withstand the mechanical and thermal stresses and strains produced during operation of the windings without yielding or buckling. As stated above with relation to FIG. 3, the interface lining material 15 has a sufficiently low shear modulus of elasticity at low temperatures so that it is capable of accommodating a large shear strain with comparatively low shear stress. Consequently, sliding motion between the winding modules and the supporting structure, i.e., shells 16, 17, can be prevented since the high interface compression pressures, even with a low coefficient of friction, result in friction forces that exceed the interface lining material shear forces. A particularly preferred interface lining material is leather which has a modulus of elasticity at low temperatures of about 60,000 psi.

Figure 5:
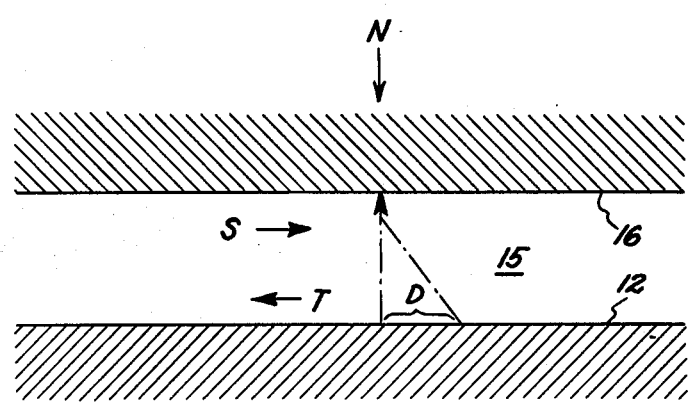
FIG. 5 is a schematic vector diagram illustrating the effect of the interface lining material when employed in a winding and support structure constructed according to the invention.

FIG. 5 is a vector diagram of the forces exerted on the interface lining material. In FIG. 5, the outer shell member 16 is shown acting with a compressional pressure force N against the interface lining material 15 disposed between the surface of winding module 12 and the surface of outer supporting shell member 16. Consider a small displacement D of the winding module 12, then the interface lining material 15 will distort to follow the displacement of the surface of the winding module 12 as depicted by the dashed lines in the space occupied by the interface lining material 15. The distortion of the interface material 15 will generate an internal shear force S proportional to the shear modulus of elasticity of the material 15. The surface of the interface material 15 will not slip relative the surface of the winding module 12 only if the shear force S is lower than the frictional force $T=fN$ that opposes movement of the surface of winding module 12 relative to the interface lining material 15. In the above expression $T=fN$ the lower case f is the coefficient of friction for the interface lining material 15. As stated above, if the interface lining material 15 has a sufficiently low shear modulus of elasticity then the condition will be met whereby the frictional forces between the interface lining material and the opposing electrical winding and support structure surfaces, even at low coefficients of friction, are considerably higher than the internal shear forces of the interface lining material.

From the above description relative to FIG. 5, it will be appreciated that by selecting a suitable interface lining material which has a sufficiently low shear modulus of elasticity at low temperatures, the interface lining material will be capable of accommodating a larger shear strain with comparatively low shear stress and little or not attendant heat generation. Consequently, sliding motion will be prevented since the high interface compression pressures, even with a low coefficient of friction, result in frictional forces T that exceed the interface lining material internal shear forces.

In fabricating one embodiment of the invention, the inner and outer frusto-conical shells 17 and 16 were made of a high strength aluminum alloy. The pole sections 19 and the wedges 21 and 22 were made of an epoxy-glass-fiber reinforced composite material that has lower coefficient of thermal contraction than the aluminum alloy. The outer shell 16 was shrunk around the subassembly of the winding, inner shell and core and wedge members using a high interference fit. As a result, at low cryogenic temperatures where the winding modules become superconducting, the shrink fit pressures are increased because the thermal contraction of the outer shell exceeds the thermal contraction of the winding-pole-wedge material combination.

In another embodiment of the invention, the inner conical shell 17 was made of a titanium alloy while the outer conical shell 16 was made of a structural aluminum alloy. The pole sections 19 also were made of a titanium alloy while the wedges 21 and 22 were made of an epoxy-glass fiber reinforced composite material. The outer shell 16 was then shrunk fit around the subassembly of the winding-core-wedges-inner shell using a moderate interference fit. In this construction both the inner shell and the winding-core-wedge material combination had a lower coefficient of thermal contraction than the outer shell. By adjusting the thickness of the inner shell to be lower than the thickness of the outer shell, the interference fit between the winding and the structure is increased at low temperatures.

Both of the methods of construction described above are capable of restricting the sliding motion at the interfaces of the winding modules with their supporting structure. The maximum computed relative motion that occurred as shear deformation of the interface lining material was of the order of 0.0025 inches. It should be noted that the choices of materials used in fabricating the inner and outer shells as well as the core and wedge material constitute only a convenient illustration of two assembly procedures. It is entirely possible that other materials such as nickel-base alloys or fiber reinforced advanced composites such as the Kevlar-epoxy or graphite-epoxy, might be equally good or better choices for actual applications of the invention.

From the foregoing description it will be appreciated that the invention provides a new and improved method and structure for supporting a superconducting winding on a support structure by means of interface lining material having a low shear modulus of elasticity whereby frictional heat generated by relative sliding motion at interfacing surfaces of the electrical winding with the support structure, is minimized. The invention is particularly well suited for use in the fabrication of superconducting windings of the type that are saddle-shaped and comprised by a number of superconducting conductor elements held together by epoxy resin to form relatively large stator or rotor windings for cryogenic generators and motors in order to overcome the problem of degradation of winding performance caused by frictional heat generated by relative sliding motion between such windings and their support structure.

Having described one embodiment of a new and improved superconducting winding and support structure constructed in accordance with the invention, it is believed obvious that other modifications and variations of the invention will be suggested to those skilled in the art in the light of the above teachings. It is therefore to be understood that changes may be made in the particular embodiments of the invention described which are within the full intended scope of the invention as defined by the appended claims.

I claim:

1. The method of restricting relative sliding motion at the interfaces between a superconducting winding and a supporting structure for said winding by means of the internal shear strain developed within an interface material having a low shear modulus of elasticity so as to accommodate large shear displacements with low shear stresses; said method comprising lining the interfaces between said superconducting winding and said supporting structure with interface material such as leather having a low shear modulus of elasticity below about 60,000 psi and subjecting the lined interface surfaces to large compressional pressure forces so that frictional forces between the interface material and the interfacing superconducting winding and supporting structure surfaces, even at low coefficients of friction, are considerably higher than the internal shear forces of the interface.

2. The method according to claim 1 wherein the interface material having low shear modulus of elasticity comprises a material selected from the group of materials consisting of leather, cellulose paper, and polyethylene paper.

3. The method according to claim 1 wherein the superconducting winding is comprised of a plurality of conductors of superconducting material bunched together in close thermal contact with one another.

4. The method according to claim 3 further comprising supplying cryogenic cooling fluid to channels within said supporting structure for bringing said cooling fluid into direct contact with said interface material.

5. The method according to claim 4 wherein the interface material is wrapped around and completely surrounds the superconducting winding and comprises a material selected from the group consisting of leather, cellulose paper, and polyethylene paper.

6. The method according to claim 1 wherein the superconducting winding is comprised of a plurality of saddle-shaped windings physically nested together one within the other and the supporting structure is comprised of two semi-cylindrical inner and outer shells compressed together with the nested saddle-shaped windings disposed within an annular space defined between the inner and outer shells and further including complementary-shaped core members and wedge-shaped wedging members tightly wedged intermediate the nested saddle-shaped windings within the annular space defined between the inner and outer shells for subjecting all of said members including the nested saddle-shaped windings and the interior surfaces of the inner and outer shells to large compressional pressure forces.

7. The method according to claim 7 wherein the superconducting winding is comprised of a plurality of conductors of superconducting material bunched together in close thermal contact with one another.

8. The method according to claim 7 further comprising supplying cryogenic cooling fluid to channels within said supporting structure for bringing said cooling fluid into direct contact with said interface material.

9. The method according to claim 7 wherein the interface material is wrapped around and completely surrounds the superconducting winding and comprises a material selected from the group consisting of leather, cellulose paper and polyethylene paper.

10. A new and improved superconducting winding and a support structure therefor together with means for restricting relative sliding motion at the interfaces between said superconducting winding and said support structure to thereby limit friction-generated heat by said winding during operation, said means comprising an interface lining material of leather having a low shear modulus of elasticity disposed between the interfacing surfaces of said superconducting winding and said support structure, and means for subjecting said lined interface surfaces to large compressional pressure forces so that frictional forces between the interface lining material and the interfacing superconducting winding and support structure surfaces, even at low coefficients of friction, are considerably higher than the internal shear forces of the interface lining material.

11. The superconducting winding and support structure according to claim 10 wherein the superconducting winding comprises a plurality of conductors of superconducting material bunched together in close thermal contact with each other and secured in a solid winding bundle by epoxy resin.

12. The superconducting winding and support structure according to claim 11 further comprising cooling channel means disposed within surfaces of said support structure for bringing cryogenic cooling fluid into direct contact with said interface material.

13. The superconducting winding and support structure according to claim 10 wherein the superconducting winding is comprised of a plurality of saddle-shaped windings physically nested one within the other and the support structure is comprised of two semi-cylindrical shells compressed together with the nested saddle-shaped windings disposed within an annular space defined between the inner and outer shells and further including complementary-shaped core members and wedging members tightly wedged intermediate the nested saddle-shaped winding within the space defined between the inner and outer shells for subjecting all of said members including the nested saddle-shaped windings and the interior surfaces of the inner and outer shells to large compressional pressure forces.

14. The electrical winding and support structure according to claim 13 wherein the superconducting winding is comprised of a plurality of conductors of superconducting material bunched together in close thermal contact with each other and secured in a solid winding bundle by epoxy resin.

15. The superconducting winding and support structure according to claim 14 further comprising cooling channel means disposed within surfaces of said support structure for bringing cryogenic cooling fluid into direct contact with said interface material.

* * * * *